United States Patent [19]
Askari et al.

[11] Patent Number: 5,482,981
[45] Date of Patent: Jan. 9, 1996

[54] OPTICALLY CLEAR POLYMER COMPOSITIONS CONTAINING AN INTERPENETRANT

[75] Inventors: Syed H. Askari, Santa Clara; Hermann H. Neidlinger, San Jose, both of Calif.

[73] Assignee: Pilkington Barnes Hind, Inc., Sunnyvale, Calif.

[21] Appl. No.: 338,744

[22] Filed: Nov. 9, 1994

[51] Int. Cl.$^6$ ............................ C08J 3/00; C08K 3/20; C08L 27/12; C08F 8/00

[52] U.S. Cl. .................. 523/106; 523/107; 523/108; 524/544; 524/548; 524/549; 524/916; 524/557; 524/563; 525/903; 525/100; 525/101; 526/200; 526/201; 526/245; 526/292.1; 526/317.1; 526/318; 526/322

[58] Field of Search ........................ 523/106, 107, 523/108; 524/544, 548, 549, 916, 557, 563; 525/903, 100, 101; 526/200, 201, 245, 292.1, 317.1, 318, 322

[56] References Cited

U.S. PATENT DOCUMENTS

| 5,170,192 | 12/1992 | Pettigrew et al. | 351/161 |
| 5,362,768 | 11/1994 | Askari et al. | 523/106 |

FOREIGN PATENT DOCUMENTS

| 0456611 | 11/1991 | European Pat. Off. . |
| 0530140 | 3/1993 | European Pat. Off. . |

Primary Examiner—Paul R. Michl
Assistant Examiner—Patrick Niland
Attorney, Agent, or Firm—Burns, Doane, Swecker & Mathis

[57] ABSTRACT

Disclosed are optically clear xerogel polymer compositions containing an interpenetrant.

17 Claims, No Drawings

OPTICALLY CLEAR POLYMER COMPOSITIONS CONTAINING AN INTERPENETRANT

BACKGROUND OF THE INVENTION

1. Field of the Invention

This invention is directed to optically clear xerogel polymer compositions containing an interpenetrant. These compositions are characterized by the presence of hydroxyl functionalities which are blocked with a removable blocking group which, after removal of the blocking groups and hydration of the composition, will have a water content of at least 10 weight percent and preferably from about 35 to about 70 weight percent and a modulus of at least about 2 Mdyne/cm$^2$.

This invention is further directed to methods for the preparation of optically clear hydrogel polymer compositions containing hydroxyl functionality and an interpenetrant.

2. State of the Art

Hydrogel polymer compositions and the use of these compositions in ophthalmic devices, especially contact lenses, are well known in the art. Such hydrogel polymer compositions are typically manufactured as copolymeric systems, optionally cross-linked which are formed in the xerogel state where they are hard materials. This xerogel, in the presence of water or other water containing solvent, hydrates and undergoes a change so that it attains the hydrogel state. Upon hydration, the resulting polymer composition contains water and, accordingly, becomes softer and more pliable as compared to the polymer composition prior to hydration. The degree of softness and pliability is related to the amount of water incorporated into the polymer composition after hydration. Additionally, contact lenses derived from polymer compositions having large amounts of water provide greater wearer comfort and higher oxygen permeability. Accordingly, the art has generally been directed to the incorporation of large amounts of water into such polymer compositions.

However, notwithstanding the desirability of incorporating large amounts of water into hydrogel polymer compositions, one problem typically encountered is that as the water contents increases, the structural rigidity of the polymer composition, as measured by its modulus, decreases and can reach a point where the structural rigidity is less than desirable. Accordingly, the hydrogel polymer composition is typically formulated to balance the need for a large water content and for a suitable modulus and the values achieved for both parameters is often compromised from ideal values.

In regard to the above, it is known in the art that an interpenetrant incorporated into a polymer composition increases the structural rigidity of the composition thereby providing a means to obtain a desired level of water content while retaining suitable structural rigidity.

However, a problem is encountered in the area of ophthalmic devices when a large amount of an interpenetrant, i.e., greater than about 1.5 weight percent (based on the dry weight of the polymer composition), is incorporated into a hydrogel polymer composition comprising hydroxyl groups. Specifically, it has been found that the use of such a large amount of interpenetrant in such hydrogel polymer compositions renders the resulting composition optically opaque. Without being limited to any theory, it is believed that the hydroxyl comprising polymer compositions have poor solubility for the interpenetrant and, accordingly, optical opacity for the resulting composition arises from phase separation of the interpenetrant from the polymer. In any event, optically opaque materials cannot be used in ophthalmic devices because optical clarity is an overriding criticality in these devices.

In one embodiment, the art has circumvented this problem by including large quantities of an organic solvent (e.g., about 80–95 weight percent or more), such as dimethyl sulfoxide (DMSO), with an interpenetrant chemically modified to include a reactive vinyl group. See, for example, European Patent Application Publication No. 0 456 611. The organic solvent acts to solubilize the interpenetrant as well as the monomer/polymer composition and the reactive vinyl group acts to covalently incorporate the interpenetrant into the polymer backbone during polymerization.

After polymerization, the resulting polymer is solvated (i.e., not a xerogel). The inclusion of large amounts of solvent in the polymers via such methods complicates the manufacturing process of ophthalmic devices from hydrogel materials because such materials are typically cast or formed in the xerogel state, and once solvated, become soft and pliable which makes machining the solvated materials difficult. Accordingly, the final shape and other physical characteristics of the polymeric article are preferably formed during the xerogel state, i.e., in the absence of significant amounts of any solvent. The inclusion of large amounts of solvent in the prior art methods for forming an optically clear polymer composition containing an interpenetrant will, however, preclude the formation of such a xerogel composition.

In view of the above, the art has heretofore been seeking, without success, an optically clear xerogel polymer composition comprising hydroxyl groups on the polymer and having incorporated therein at least about 1.5 weight percent of an interpenetrant.

SUMMARY OF THE INVENTION

This invention is directed, in part, to optically clear xerogel polymer compositions comprising a polymer and at least about 1.5 weight percent of an interpenetrant (based on the weight of the xerogel) wherein the polymer comprises blocked hydroxyl functional groups wherein the blocking groups are removable. The xerogel polymer compositions are further characterized as forming, upon deblocking and hydration, a hydrogel polymer composition having a water content of at least 10 weight percent and preferably from about 35 to about 70 weight percent and a modulus of at least about 2 Mdynes/cm$^2$.

Accordingly, in one of its composition aspects, this invention is directed to an optically clear xerogel polymer composition comprising:

a polymer comprising blocked hydroxyl functional groups, and at least about 1.5 weight percent of an interpenetrant based on the total weight of the xerogel polymer composition wherein said composition has a sufficient optical clarity to permit the passage of at least 80% of visible light through a 0.1 millimeter (mm) thick sample of the composition.

In a preferred embodiment, the polymer composition described above is cross-linked. In a further preferred embodiment, the polymer composition, after deblocking and hydration, has a water content of at least 10 weight percent and even more preferably from about 35 to about 70 weight percent water based on the total weight of the hydrated hydrogel polymer composition and a modulus of at least about 2 Mdynes/cm$^2$.

In a further preferred embodiment, the hydrated hydrogel polymer composition prepared from the xerogel polymer described above has a modulus of from 2 to 50 Mdyne/cm$^2$, more preferably 5 to 30 Mdyne/cm$^2$ and still more preferably greater than about 12 Mdyne/cm$^2$, a percent elongation of greater than about 100% and more preferably greater than about 175% and an oxygen permeability of greater than about 10 Dk units and more preferably greater than about 18 Dk units.

In a still further preferred embodiment, the hydrated hydrogel polymer composition has a water content of from about 45 to 70% and more preferably about 50%.

This invention is also directed, in part, to the unexpected discovery that the preparation of such optically clear hydrogel polymer compositions can be obtained by placing a removable block group on the hydroxyl groups of the monomer component(s) prior to polymerization and incorporation of an interpenetrant therein. After polymerization and interpenetrant incorporation, the blocking groups are removed and the xerogel polymer composition hydrated to provide for an optically clear hydrogel polymer composition.

Accordingly, in one of its method aspects, this invention is directed to a method for the preparation of an optically clear xerogel polymer composition comprising a polymer comprising hydroxyl functionalities which functionalities are blocked with a removable blocking group, and at least about 1.5 weight percent of an interpenetrant based on the total weight of the xerogel polymer composition which method comprises:

(a) selecting a monomer composition wherein each component thereof comprises a reactive vinyl functionality and at least one of the components of the composition comprises at least one hydroxyl functional group;

(b) blocking the hydroxyl functionalities on each of the hydroxyl containing monomer components selected in (a) above with a removable blocking group;

(c) combining said monomer composition with at least 1.5 weight percent of an interpenetrant based on the total weight of the composition; and (d) polymerizing the composition produced in (c) above to provide for an optically clear xerogel polymer composition.

In a preferred embodiment, the method described above further comprises:

(e) removing the blocking groups from said hydroxyl groups; and (f) hydrating the composition produced in (e) above.

In another preferred embodiment, an effective amount of a cross-linker is incorporated into the monomer composition prior to polymerization procedure (d).

DETAILED DESCRIPTION OF THE INVENTION

As noted above, this invention is directed, in part, to optically clear xerogel polymer compositions containing an interpenetrant and methods for preparing such compositions. However, prior to discussing this invention in further detail, the following terms will first be defined:

The term "hydrogel polymer composition" refers to the polymer compositions described herein which, after polymer formation, are hydratable when treated with water and, accordingly, can incorporate water into the polymeric matrix without itself dissolving in water. Typically, water incorporation is effected by soaking the polymer composition in a water solution for a sufficient period so as to incorporate at least 10 weight percent water and preferably from about 35 to about 70 weight percent water, and more preferably about 50 weight percent water, into the polymer composition based on the total weight of the polymer composition.

The term "xerogen polymer composition" refers to the composition formed in the absence of large quantities of added solvent wherein any solvent in the polymer composition is typically less than about 5 weight percent of the total composition and more preferably less than about 2 weight percent of the total composition.

The term "removable blocking group" refers to any group which when bound to one or more hydroxyl groups prevents reactions from occurring at these hydroxyl groups and which protecting groups can be selectively removed by conventional chemical and/or enzymatic procedures to reestablish the hydroxyl group. The particular removable blocking group employed is not critical and preferred removable hydroxyl blocking groups include conventional substituents such as benzyl, benzoyl, acetyl, chloroacetyl, trichloroacetyl, fluoroacetyl, trifluoroacetyl, t-butylbiphenylsilyl and any other group that can be introduced onto a hydroxyl functionality and later selectively removed by conventional methods in mild conditions compatible with the nature of the product. In a particularly preferred embodiment, the removable blocking group is a solvolyzable blocking group.

In another preferred embodiment, the removable blocking group is selected such that upon hydration and removal of the removable blocking group, little or no dimensional change occurs in the polymer. More preferably, the extent of dimensional change, as measured by change in percent expansion, is controlled to less than about ±25 % and even more preferably to less than about ±10%.

The term "solvolyzable" or "solvolyzable blocking groups" refers to groups capable of cleavage into a carboxyl containing compound and an alcohol, in the presence of a nucleophile, for example, a hydroxyl ion in water or a weak base such as ammonia or an organic amine or a $C_1$ to a $C_4$ alcohol Solvolyzable blocking groups include acyl and haloacyl blocking groups of from 2 to 8 carbon atoms as well as a haloacyl blocking group of the formula $X_3CC(O)O$— wherein each X is independently selected from the group consisting of fluoro and chloro. Preferably, the solvolyzable groups are capable of being solvolyzed under mild solvolysis conditions such as in aqueous solutions of a pH of from greater than 7 to less than about 12 and a temperature of less than about 60° C. Such solvolyzable leaving groups are well known in the art and a list of such solvolyzable leaving groups is described in, for example, European Patent Application Publication No. 0 495 603 A1, U.S. Pat. No. 4,638,040 and U.S. Pat. No. 5,362,768, all of which are incorporated herein by reference in their entirety.

The term "interpenetrant" refers to structurally rigid, high molecular weight materials which are soluble, at the levels employed, in at least one of the components utilized in preparing the polymer compositions described herein. Such interpenetrants are well known in the art and include, by way of example, siloxane, polyurethane, cellulose acetate butyrate, cellulose, hydroxyethyl cellulose and hydroxypropyl cellulose, hydroxyethyl hydroxypropyl cellulose, mixtures of interpenetrants, as well as interpenetrants chemically modified to include a polymerizable group such as vinyl groups, epoxide groups, isocyanates, etc. (see, for example European Patent Application Publication No. 0 456 611) and the like. Such interpenetrants are either commercially available or can be prepared by art recognized techniques from commercially available starting materials. The particular interpenetrant employed is not critical. Preferably, the interpenetrant has a molecular weight of from about 1,000 to about 50,000,000 and more preferably from about 5,000 to about 500,000.

Interpenetrants are considered as structurally rigid if 1.5% of the interpenetrant increases the modulus of a polymer composition by at least 1 Mdyne/cm$^2$ as compared to the same polymer composition in the absence of the interpenetrant.

The term "compatible ethylenically unsaturated monomers free of hydroxyl groups" refers to monomers which do not contain either hydroxyl groups or blocked hydroxyl groups; which can participate in polymer formation with a monomer containing hydroxyl groups blocked with a removable blocking group; and which, when so incorporated into the polymer composition provide for a polymer composition which, after solvolysis and hydration, is suitable for use in ophthalmic devices, i.e., the hydrogel polymer is clear so as to transmit visible light. Suitable compatible ethylenically unsaturated monomers free of hydroxyl groups include, by way of example, methyl acrylate, methyl methacrylate, trifluoromethyl methacrylate, trifluoromethyl acrylate, 2',2',2'-trifluoroethyl methacrylate, 2',2',2'-trifluoroethyl acrylate, ethyl methacrylate, ethyl acrylate, styrene, and the like. Such materials are well known in the art and are either commercially available or can be prepared by methods known per se in the art.

Preferably, the compatible ethylenically unsaturated monomer free of hydroxyl groups solubilizes, in whole or in part, the interpenetrant employed. A particularly preferred combination of a compatible ethylenically unsaturated monomer free of hydroxyl groups and an interpenetrant is methyl methacrylate and cellulose acetate butyrate. Another preferred compatible ethylenically unsaturated monomer free of hydroxyl groups is phenoxyethyl methacrylate which also solubilizes cellulose acetate butyrate, although less efficiently than methyl methacrylate.

The term "cross-linking agent" refers to a monomer containing at least two reactive groups capable of forming covalent linkages with reactive groups found on at least one of the monomers used to prepare the polymer compositions described herein. Suitable reactive groups include, for example, vinyl groups which can participate in the polymerization reaction. The reactive groups are typically substituents on a suitable backbone such as a polyoxyalkylene backbone (including halogenated derivatives thereof), a polyalkylene backbone, a glycol backbone, a glycerol backbone, a polyester backbone, a polyamide backbone, polyurea backbone, a polycarbonate backbone, and the like.

Cross-linking agents for use in the preferred compositions described herein are well known in the art and the particular cross-linking agent employed is not critical. Preferably, however, the reactive vinyl group is attached to the backbone of the cross-linking agent via an ester bond such as that found in acrylate and methacrylate derivatives such as urethane diacrylate, urethane dimethacrylate, ethylene glycol diacrylate, ethylene glycol dimethacrylate, polyoxyethylene diacrylate, polyoxyethylene dimethacrylate, and the like. However, other suitable vinyl compounds include, by way of example, di- and higher- vinyl carbonates, di- and higher-vinyl amides (e.g., $CH_2$=CH-C(O)NHCH$_2$CH$_2$NHC(O)CH=CH$_2$), and the like.

Preferred cross-linking agents include, by way of example, ethylene glycol dimethacrylate, ethylene glycol diacrylate, diethylene glycol dimethacrylate, diethylene glycol diacrylate, triethylene glycol dimethacrylate, triethylene glycol diacrylate, tetradecaethylene glycol dimethacrylate, tetradecaethylene glycol diacrylate, allyl methacrylate, allyl acrylate, trimethylol-propane trimethacrylate, trimethylol-propane triacrylate, 1,3-butanediol dimethacrylate, 1,3-butanediol diacrylate, 1,4-butanediol dimethacrylate, 1,4-butanediol diacrylate, 1,6-hexanediol dimethacrylate, 1,6-hexanediol diacrylate, 1,9-nonanediol dimethacrylate, 1,9-nonanediol diacrylate, 1,10-decanediol dimethacrylate, 1,10-decanediol diacrylate, neopentyl glycol dimethacrylate, neopentyl glycol diacrylate, 2,2'bis[p-(γ-methacryloxy-β-hydroxypropoxy)phenyl]propane, pentaerythritol triacrylate, pentaerythritol trimethacrylate, pentaerythritol tetraacrylate, pentaerythritol tetramethacrylate, 1,4-cyclohexanediol diacrylate, 1,4-cyclohexanediol dimethacrylate, ethoxylated bis-phenol-A-diacrylate, ethoxylated bis-phenol-A-dimethacrylate, bis-phenol-A-dimethacrylate, bis-phenol-A-diacrylate, N,N'-methylenebisacrylamide, as well as difunctional macromers having a molecular weight of from about 1,000 to about 1,000,000. Such materials are well known in the art and are either commercially available or can be prepared by methods known per se in the art.

The cross-linking agent preferably has at least 2 and more preferably from 2 to about 6 vinyl functionalities and preferably has a number average molecular weight of from about 100 to about 2,500 (except for the macromers described above). More preferably, the vinyl functionalities are acrylate or methacrylate groups attached to a polyoxyalkylene backbone (including halogenated derivatives thereof), a polyalkylene backbone, a glycol backbone, a glycerol backbone, a polyester backbone, or a polycarbonate backbone.

Formulations

The polymer compositions described herein are prepared by first preparing a suitable formulation containing the requisite components and then polymerizing the formulation. Specifically, the formulation comprises a monomer composition and an interpenetrant.

The monomer composition comprises at least one monomer component comprising a reactive vinyl functionality and at least one hydroxyl functional group wherein the hydroxyl groups are blocked with a removable blocking group. Suitable hydroxyl monomer components (prior to blocking) include hydroxyethyl methacrylate (HEMA), hydroxyethyl acrylate, glycidyl methacrylate, glycidyl acrylate, hydroxypropyl methacrylate, hydroxypropyl acrylate, butanediol monomethacrylate, mixtures of such components, and the like. Suitable blocking groups include, by way of example only, benzyl, benzoyl, acetyl, chloroacetyl, trichloroacetyl, fluoroacetyl, trifluoroacetyl, t-butyl-biphenylsilyl groups, and the like. When the monomer component contains more than one hydroxyl group, e.g., glycidyl methacrylate, the removable blocking groups employed therewith may be the same or different groups but, for ease of synthesis, are preferably the same.

The monomer composition can optionally contain one or more compatible ethylenically unsaturated monomers free of hydroxyl groups. When the monomer composition does contains such ethylenically unsaturated monomers free of hydroxyl groups, the composition preferably comprises sufficient hydroxyl containing monomers such that the resulting hydrogel polymer composition will absorb at least 10 weight percent and more preferably from 35 to about 70 weight percent water. In a particularly preferred embodiment, the monomer composition comprises at least about 20 weight percent of monomer component(s) comprising a reactive vinyl functionality having at least one hydroxyl functional group wherein the hydroxyl groups are blocked with a removable blocking group and more preferably from about 50 to about 100 weight percent based on the total weight of the monomer composition and still more preferably from about 80 to 100 weight percent.

The formulation also contains an interpenetrant which is employed in the amount of at least about 1.5 weight percent based on the total weight of the formulation (in the absence of any water) and preferably from about 5 to about 60 weight percent and more preferably from about 5 to about 30 weight percent. The use of higher concentrations of interpenetrant may decrease the water content of the resulting hydrated polymer composition. The specific amount of interpenetrant employed is selected so that the hydrogel polymer composition has a modulus of at least 2 Mdynes/cm$^2$, preferably 2 to 50 Mdynes/cm$^2$ and more preferably 2 to 30 Mdynes/cm$^2$.

The compositions of this invention are preferably cross-linked and, accordingly, one of the components of a preferred formulation is a cross-linking agent. When employed, the cross-linking agent is employed in an amount sufficient to provide a cross-linked product but preferably is employed in an amount of from about 0.1 to about 30 weight percent, more preferably from about 0.1 to about 5 weight percent and still more preferably from about 0.2 to about 3 weight percent based on the total weight of the formulation. The use of higher amounts of cross-linker appears to correlate to polymer compositions having a higher modulus but lower water content and a lower percent elongation.

The formulation can optionally contain one or more additional components such as initiators, colorants, etc. which are conventionally employed in the art.

These formulations as well as the reagents employed to prepare these formulations are preferably stored and formulated in containers which prevent premature polymerization of one or more of the reagents. For example, the use of amber bottles for storing reagents inhibits photo-induced polymerization.

Methodology

The formulations described above are readily polymerized by conventional techniques such as thermal, UV, γ irradiation, or electron beam induced polymerization to provide for the polymer composition. For example, thermal induced polymerization can be achieved by combining a suitable polymerization initiator into the mixture of monomers under an inert atmosphere (e.g., argon) and maintaining the mixture at an elevated temperature of from about 20° C. to about 75° C. for a period of time from about 1 to about 48 hours.

Ultraviolet (UV) induced polymerization can be achieved by combining a suitable polymerization initiator into the mixture of monomers under an inert atmosphere (e.g., argon) and maintaining the mixture under a suitable UV source. Preferably, UV induced polymerization is conducted at ambient conditions for a period of from about 5 minutes to 24 hours.

Suitable polymerization initiators are well known in the art including thermal initiators such as t-butyl peroxy pivalate (TBPP), t-butyl peroxy neodecanoate (TBPN), benzoyl peroxide, methyl ethyl ketone peroxide, diisopropyl peroxycarbonate and the like and UV initiators such as benzophenone, Darocur 1173 (available from Ciba Geigy, Ardsley, N.Y., USA), bis-azoisobutyronitrile and the like.

The particular thermal or UV initiator employed is not critical and sufficient initiator is employed to catalyze the polymerization reaction. Preferably, the initiator is employed at up to about 1 weight percent based on the total weight of the composition.

Polymerization achieved by either electron beams or γ irradiation does not require the use of an initiator and the formulation to be polymerized is merely exposed to the electron beam or γ irradiation using conventional methods.

Polymerization is typically conducted in a manner so as to facilitate manufacture of the finished contact lens. For example, polymerization can be conducted in molds which correspond to the structure of the contact lens. Alternatively, polymerization can be conducted so as to form a polymer rod which can be machined (lathed) to provide contact lenses of suitable dimensions. In this latter embodiment, polymerization can be conducted in a silylated glass test tube and after polymerization, the test tube is broken to provide for the polymeric rod. The rod, in the form of the xerogel, can be machined, for example, lathed, cut, milled, and consequently, the rod can be made into contact lenses by cutting small cylinders or buttons from the rod and subsequent lathing. In still another alternative embodiment, polymerization can be conducted in a base curve mold to provide a button suitable for forming a contact lens.

In any event, after polymerization, a post-curing procedure is optionally employed to complete the polymerization process which post-curing step typically increases the hardness of the polymer. The post-curing procedure can comprise heating the polymer to a temperature of from about 60° C. to 120° C. for a period of from about 2 to about 24 hours. Alternatively, the post-curing step can employ γ irradiation of from about 0.1 to about 5 Mrad. Combinations of these two procedures can also be employed.

The polymer compositions described above, preferably in the contact lens forms described, are then subjected to removal of the removable blocking group and hydrolysis. The conditions for removal of the removable blocking group are dependent, of course, on the blocking group employed and it is well within the skill of the art to select the appropriate conditions relative to the blocking group employed. Either during or after removal of the removable blocking group, the composition is then subjected to conventional hydration to provide for the hydrated form of the composition.

In a particularly preferred embodiment, the removable blocking group is a solvolyzable blocking group and solvolysis of the blocking groups and hydration of the polymer composition occurs simultaneously. Solvolysis is preferably conducted by suspending the contact lens in an aqueous solution in the presence of a nucleophile, for example, a hydroxyl ion in water or a weak base such as ammonia or an organic amine or a $C_1$ to a $C_4$ alcohol. Preferably, the solvolyzable groups are capable of being solvolyzed under mild solvolysis conditions such as in aqueous solutions of a pH of from greater than 7 to less than about 12 and a temperature of from about 10° C. to about 60° C.

Under these conditions, hydration of the polymer material also occurs. However, if desired, a separate hydration step can be employed. Hydration is continued until the polymer composition is fully hydrated which, in the present case, means that the water content of the hydrogel is from about 35 to about 70 weight percent.

In still another embodiment, water can be included in the polymerization step resulting in direct inclusion of water into the polymer composition.

Utility

The xerogel polymer compositions described herein are suitable for use in medical and non-medical applications such as water absorbent materials useful in a variety of applications. After water incorporation, the polymer compositions described herein are particularly suitable for use in ophthalmic devices such as contact lenses providing requisite optical clarity, water content, high strength, no deterioration over time, relatively slow release of hydrated water upon exposure to air, and good optical properties including transparency.

When formed into contact lenses, the lenses are typically dimensioned to be from about 0.02 to about 0.15 millimeters in thickness and preferably from about 0.05 to about 0.10 millimeters in thickness (all thicknesses measured in the xerogel state).

The invention will now be illustrated by way of examples which are provided for the purpose of illustration only and are not intended to be limiting in the present invention.

In the following examples, the following abbreviations represent the following:

BPAGMA=bis-phenol-A 2-hydroxypropyl dimethacrylate
CAB=cellulose acetate butyrate
cm=centimeter
EGDMA=ethylene glycol dimethacrylate
EWC=equilibrium water content
EX33 =Esperox 33®(t-butylperoxyneodecanoate)
GMA=glycidyl methacrylate
HCEGMA=di-trichloroacetate ester of glyceryl methacrylate
LE=linear expansion
Mdynes=megadynes
min=minute
mm=millimeter
MMA=methyl methacrylate
ppm=parts per million

EXAMPLES

In the examples set forth below, polymer compositional values are set forth for the Equilibrium Water Content ("EWC"), linear expansion and tensile properties (i.e., tensile strength, percent elongation and modulus). Unless otherwise indicated, these values were determined as follows:

Measurement of Equilibrium Water Content

Equilibrium Water Content (EWC) is determined by soaking the polymer samples in phosphate buffered saline solution for overnight. The samples are removed, lightly blotted dry with a tissue and subsequently weighed. The hydrated samples are then placed in a vacuum oven at 60° C. overnight. The next flay, the sample is reweighed. Equilibrium Water Content is calculated using the following equation:

$$EWC = \frac{X-Y}{X} \times 100\%$$

where
X=mass of hydrated polymer
Y=mass of dehydrated polymer
The EWC is sometimes referred to as the % water.

Measurement of Linear Expansion

Linear Expansion factor is determined by measuring the diameter of the xerogel polymer sample using the Nikon Profile Projector V-12 (available from Nippon Kogaku K.K., Tokyo, Japan). The sample is then soaked overnight in phosphate buffered saline solution. The diameter is subsequently remeasured in phosphate buffered saline. Linear Expansion is calculated using the following equation:

$$LE = \frac{X}{Y}$$

where
X=hydrated polymer diameter
Y=Initial (dry) polymer diameter

Measurement of Tensile Properties

From a disc or a lens, a "dumb-bell" shaped specimen is cut. The sample is inspected under a microscope for nicks and cuts. If these are observed the sample is discarded. The thickness of the specimen is then measured.

The sample is then placed between the clamps on an Instron tensile tester (available from Instron Corp., Canton, Massachusetts, USA) or an equivalent instrument. The initial grip separation used is 10 mm. The sample is placed under saline during measurement to prevent drying out. The experiment is then started with the cross-head speed set to 5 mm/min. The Instron records the force required to pull on the sample as a function of cross-head displacement. This information is then converted into a stress-strain plot. The experiment continues until the sample breaks.

From the stress strain plot are calculated the following:

Tensile strength: The maximum stress the sample can withstand before breaking.

Elongation: The amount of extension (expressed as a percent of original length/grip separation) the sample undergoes before breaking.

Modulus: Is the slope of the initial linear portion of the stress-strain curve.

The experiment is usually repeated with 5 samples from the same batch of polymer and the average and standard deviation are reported.

Comparative Example A and Example 1 below illustrate that blocking of the hydroxyl groups on the hydrophilic monomer is essential to preparing an optically clear xerogel polymer composition incorporating an interpenetrant. Examples 2–3 exemplify that dimensional change occurring during hydration can be controlled by selection of the polymer composition relative to the removable blocking group. Examples 4–21 illustrates further examples of polymer compositions of this invention. Example 22 illustrates enhancements in the amount of surface wettability achieved for molded ophthalmic devices from polymer compositions made via the methods of this invention.

COMPARATIVE EXAMPLE A and EXAMPLE 1

Two xerogel polymer compositions were prepared by incorporating an interpenetrant into the polymer composition which polymer compositions in the hydrogel form contained hydroxyl functionality. Specifically, the first composition, Comparative Example A, was prepared such that the hydroxyl functionalities on the glycidyl methacrylate were not blocked with a removable blocking group during polymer formation. Contrarily, in Example 1, the hydroxyl groups were blocked with a removable blocking group (i.e., as the trichloroacetate ester).

Specifically, the formulations for Comparative Example A and Example 1 are as set forth in Table I below:

TABLE I

|  | Monomer A | MMA/CAB[1] | BPAGMA[2] | EX33[3] |
|---|---|---|---|---|
| Example 1 | HCEGMA[4] (17.72 g) | 2.19 g | 0.274 g | 0.107 g |
| Comparative Example A | GMA (12.58) | 4.38 g | 0.548 g | 0.107 g |

[1]MMA/CAB = 30% wt:wt cellulose acetate butyrate in methyl methacrylate
[2]BPAGMA = bis-phenol-A 2-hydroxypropyl dimethacrylate (1:2 wt:wt BPAGMA in DMSO)
[3]EX33 = Esperox 33 ®
[4]HCEGMA = di-trichloroacetate ester of glyceryl methacrylate (stored at least at –5° C. and preferably at –5° C.)

These formulations were prepared by combining monomer A with both the methyl methacrylate/cellulose acetate butyrate composition and the cross-linker (BPAGMA). The composition was then mixed for 1 hour and, afterwards, degassed for 6 minutes. At this point, the initiator (EX33) was added to the composition and the formulation was again degassed, this time for 30 seconds. Degassing was conducted in order to avoid contamination of the reaction vessel with oxygen which may have an adverse effect on the degree of polymerization. The resulting formulation was polymerized and cured in a programmable oven ramped at 10° C./minute in the following manner to provide for a xerogel polymer composition:

1) 40° C./2 hours
2) 55° C./2 hours
3) 70° C./2 hours
4) room temperature/4 hours Afterwards, the xerogel polymers of Comparative Example A and Example 1 were subjected to hydrolysis using a 5% solution of ammonium hydroxide which, in the case of Example 1, resulted both in removal of the blocking groups (via solvolysis) and hydration of the polymer composition. The clarity/opaqueness of the resulting polymer compositions are set forth in Table II below:

TABLE II

| POLYMER OF | OPTICAL PROPERTY AS THE XEROGEL | OPTICAL PROPERTY AS THE HYDROGEL |
|---|---|---|
| Comparative Example A | optically opaque | optically opaque |
| Example 1 | optically clear | optically clear |

Other physical properties for the polymer of Example 1 were determined to be as follows: tensile strength=13.8±5.8 Mdynes/cm$^2$; percent elongation=211±89; modulus= 22.1±12.3; and an EWC= 52.3±2.5.

The results of this comparison establish that hydrogel polymer compositions containing an interpenetrant require the blocking of the hydroxyl groups on the monomers prior to polymerization in order to achieve optical clarity in either the xerogel or hydrogel composition. The physical properties of the polymer of Example 1 establish that this polymer possesses tensile strength, percent elongation, modulus and EWC values suitable for use in ophthalmic devices.

EXAMPLES 2 and 3

The following examples illustrate that selection of the removable blocking group can be made to control of dimensional change arising from hydrating the polymer composition. Specifically, the formulations for Examples 2 and 3 are as set forth in Table III below:

TABLE III

|  | HCEGMA[5] | MMA/CAB[6] | BPAGMA[7] | EX33[8] |
|---|---|---|---|---|
| Example 2 | 94.24 wt % | 5.236 wt % | 0.523 wt % | 0.4 wt % |
| Example 3 | 89.22 wt % | 9.345 wt % | 0.9345 wt % | 0.4 wt % |

[5]HCEGMA = di-trichloroacetate ester of glyceryl methacrylate (stored at least at –5° C. and preferably at –5° C.)
[6]NMA/CAB = 30% wt:wt cellulose acetate butyrate in methyl methacrylate
[7]BPAGMA = bis-phenol-A 2-hydroxypropyl dimethacrylate (1:2 wt:wt BPAGMA in DMSO)
[8]EX33 = Esperox 33 ®

These formulations were polymerized and cured in the manner described above for Comparative Example A and Example 1 to provide for optically clear xerogel polymer compositions.

Afterwards, the xerogel polymers of Examples 2 and 3 were subjected to hydrolysis using a 5% solution of ammonium hydroxide which resulted both in removal of the blocking groups (via solvolysis) and hydration of the polymer composition. The resulting compositions were both optically clear and had the physical properties set forth in Table IV below:

TABLE IV

| Ex. No. | Modulus[A] | Tens.[B] | % Elong. | EWC | Linear Expansion |
|---|---|---|---|---|---|
| 2 | 4.4 ± 1.1 | 4.1 ± 1.6 | 117 ± 28 | 64.4 ± 0.9% | 22.2% |
| 3 | 12.5 ± 1.7 | 14.8 ± 6.7 | 140 ± 40 | 51.2 ± 0.7% | 5.5% |

[A]= in Mdynes/cm$^2$
[B]= in Mdynes/cm$^2$

In both cases, the percent of linear expansion was maintained to less than 25% evidencing a degree of control of expansion arising from hydration. Example 3, in particular, exemplifies a polymer composition having approximately 513% water which undergoes minimal expansion during hydration.

Accordingly, by selecting the removable blocking groups relative to the amount of water to be absorbed, it is possible to provide for a polymer composition having little dimensional change during hydration.

EXAMPLES 4–21

The following examples are examples of optically clear polymer compositions, both as the xerogel and the hydrogel, within the scope of this invention. These polymer compositions were prepared in the manner described above and hydrated in a manner similar to that also described above. The formulations employed to prepare these polymer compositions are described in Table V below:

TABLE V

|  | HCEGMA[5] | MMA/CAB[6] | BPAGMA[7] | EX33[8] |
| --- | --- | --- | --- | --- |
| Example 4 | 94 | 8 | 0.5 | 0.4 wt % |
| Example 5 | 97 | 8 | 0.5 | 0.4 wt % |
| Example 6 | 94 | 8 | 1.0 | 0.4 wt % |
| Example 7 | 97 | 8 | 1.0 | 0.4 wt % |
| Example 8 | 94 | 12 | 0.5 | 0.4 wt % |
| Example 9 | 97 | 12 | 0.5 | 0.4 wt % |
| Example 10 | 94 | 12 | 1.0 | 0.4 wt % |
| Example 11 | 97 | 12 | 1.0 | 0.4 wt % |
| Example 12 | 96 | 11 | 0.4 | 0.4 wt % |
| Example 13 | 98 | 11 | 0.4 | 0.4 wt % |
| Example 14 | 96 | 13 | 0.4 | 0.4 wt % |
| Example 15 | 98 | 13 | 0.4 | 0.4 wt % |
| Example 16 | 96 | 11 | 0.4 | 0.4 wt % |
| Example 17 | 98 | 11 | 0.4 | 0.4 wt % |
| Example 18 | 96 | 13 | 0.4 | 0.4 wt % |
| Example 19 | 98 | 13 | 0.4 | 0.4 wt % |
| Example 20 | 97 | 12 | 0.4 | 0.4 wt % |
| Example 21 | 96 | 11 | 0.4 | 0.4 wt % |

[5]HCEGMA = di-trichloroacetate ester of glyceryl methacrylate (stored at −5° C.)
[6]MMA/CAB = 30% wt:wt cellulose acetate butyrate in methyl methacrylate
[7]BPAGMA = bis-phenol-A 2-hydroxypropyl dimethacrylate (1:2 wt:wt BPAGMA in DMSO)
[8]EX33 = Esperox 33 ®

In Examples 4–21, HCEGMA, MMA/CAB and BPAGMA amounts are all reported in parts by weight.

EXAMPLE 22

The purpose of this example is to illustrate the enhancement in surface wettability of molded ophthalmic devices (contact lenses) made via the methods of this invention as compared to conventional prior art methods. Specifically, when polymerization of the monomer mix is conducted in a polypropylene mold, the hydrophobic nature of the mold tends to orient the molecules during polymerization such that the resulting polymer surface contains a more hydrophobic nature than the interior of the polymer.

This difference can be quantified by comparing the contact angle of the surface of the polymer to that of a surface formed by lathing the polymer such that the interior of the polymer is exposed. Typically, when the hydroxyl groups of the monomer are not blocked prior to polymerization, the resulting polymer composition will have a significant increase in the contact angle of the surface formed during polymerization as opposed to the contact angle of a surface formed after polymerization by lathing. The increase in contact angle corresponds to a reduction in surface wettability.

In the present case, a polymer composition formed in the manner described above was tested for its contact angle for both the surface formed during polymerization as opposed to the contact angle of a surface formed after polymerization by lathing. In both cases, the contact angle was 40°±2° evidencing that there was no reduction in surface wettability between the surface formed during polymerization and the interior of the polymer. Without being limited to any theory, it is believed that the blocking groups employed on the hydroxyl groups of this invention alter the hydrophilic nature of the monomer to a more hydrophobic nature thereby permitting orientation of these groups on the surface of the polymer. After polymer formation, the removal of these blocking groups exposes hydroxyl groups on the surface of the polymer. In any event, the enhanced surface wettability is a beneficial attribute of the polymers of this invention.

By following the procedures set forth above, other optically clear polymer compositions containing an interpenetrant and hydroxyl groups can be prepared merely by substitution of an appropriate reagent for the reagent recited in the examples above. For example, a polymer composition employing EGDMA can be prepared as above merely by substituting the BPAGNA cross-linker with the EGDMA cross-linker. In such a case, 0.0355 grams of the EGDMA can replace 0.274 grams of the BPAGMA/DMSO cross-linker. Other substitutions can be readily done which substitutions are well within the skill of the art.

What is claimed is:

1. An optically clear xerogel polymer composition comprising:

a polymer comprising hydroxyl functional groups blocked with a removable blocking group, and at least about 1.5 weight percent of an interpenetrant based on the total weight of the xerogel polymer composition wherein said interpenetrant is selected, from the group consisting of siloxane polyurethane, cellulose acetate butyrate, cellulose, hydroxyethyl cellulose, hydroxypropyl cellulose, hydroxyethyl hydroxypropyl, cellulose, mixtures thereof and interpenetrants selected from the group consisting of siloxane, polyurethane, cellulose acetate butyrate, cellulose, hydroxyethyl cellulose, hydroxypropyl cellulose. hydroxyethyl hydroxypropyl, cellulose, comprising a polymerizable group selected from the group consisting of vinyl groups, epoxide groups and isocyanoate groups wherein said composition has a sufficient optical clarity to permit the passage of at least 80% of visible light through a 0.1 millimeter (mm) thick sample of the composition.

2. The polymer composition according to claim 1 wherein said composition is cross-links.

3. The polymer composition according to claim 1 wherein the polymer composition, after deblocking and hydration, has a water content of from about 35 to about 70 weight percent water based on the total weight of the hydrated hydrogel polymer composition and a modulus of at least about 2 Mdynes/cm².

4. The xerogel polymer composition according to claim 1 wherein said composition comprises from at least about 5 weight percent to about 60 weight percent of an interpenetrant.

5. The xerogel polymer composition according to claim 1 wherein said removable blocking groups are selected from the group consisting of benzyl, benzoyl, t-butylbiphenylsilyl and acyl and haloacyl blocking groups of from 2 to 8 carbon atoms.

6. The xerogel polymer composition according to claim 1 wherein said composition is sufficiently optically clear to permit the passage of at least 90% of visible light through a 0.1 mm thick sample of the composition.

7. An optically clear cross-linked xerogel polymer composition comprising:

from about 70 to about 95 weight percent of di-trichloroacetate ester of glyceryl methacrylate hydroxyl functional groups based on the total weight of the composition, from about 1.5 to about 30 weight percent of cellulose acetate butyrate based on the total weight of the composition, and from about 0.1 to about 30 weight percent of a cross-linking agent based on the total weight of the composition.

8. An ophthalmic device comprising a-polymer composition according to claim 1.

9. The ophthalmic device according to claim 8 wherein said device is a contact lens.

10. A method for the preparation of an optically clear xerogel polymer composition comprising a polymer comprising hydroxyl functionalities which functionalities are blocked with removable blocking groups, and at least about 1.5 weight percent of an interpenetrant based on the total weight of the xerogel polymer composition wherein the polymer composition has sufficient optical clarity to permit the passage of at least 80% of visible light through a 0.1 millimeter (mm) thick sample of the composition which method comprises:

(a) selecting a monomer composition wherein each component thereof comprises a reactive vinyl functionality and at least one of the components of the composition comprises at least one hydroxyl functional group;

(b) blocking the hydroxyl functionalities on each of the hydroxyl containing monomer components selected in (a) above with a removable blocking group;

(c) combining said monomer composition with at least 1.5 weight percent of an interpenetrant based on the total weight of the composition wherein said interpenetrant is selected from the group consisting of siloxane, polyurethane, cellulose acetate butyrate, cellulose, hydroxyethyl cellulose, hydroxypropyl cellulose, hydroxyethyl hydroxypropyl cellulose, mixtures thereof and interpenetrants selected from the group consisting of siloxane, polyurethane, cellulose acetate butyrate, cellulose, hydroxyethyl cellulose, hydroxypropyl cellulose, hydroxyethylhydroxy propyl cellulose comprising a polymerizable group selected from the group consisting of vinyl groups, epoxide groups and isocyanoate groups; and (d) polymerizing the composition produced in (c) above to provide for an optically clear xerogel polymer composition.

11. A method for the preparation of an optically clear hydrogel polymer composition comprising a polymer comprising hydroxyl functionalities and at least about 1.5 weight percent of an interpenetrant based on the total weight of the xerogel polymer composition wherein the polymer composition has sufficient optical clarity to permit the passage of at least 80% of visible light through a 0.1 millimeter (mm) thick sample of the composition which method comprises:

(a) selecting a monomer composition wherein each component thereof comprises a reactive vinyl functionality and at least one of the components of the composition comprises at least one hydroxyl functional group;

(b) blocking the hydroxyl functionalities on each of the hydroxyl containing monomer components selected in (a) above with a removable blocking group;

(c) combining said monomer composition with at least 1.5 weight percent of an interpenetrant based on the total weight of the composition wherein said interpenetrant is selected from the group consisting of siloxane, polyurethane, cellulose acetate butyrate, cellulose, hydroxyethyl cellulose, hydroxypropyl cellulose, hydroxyethyl hydroxypropyl cellulose, mixtures thereof and interpenetrants selected from the group consisting of siloxane, polyurethane, cellulose acetate butyrate, cellulose, hydroxyethyl cellulose, hydroxypropyl cellulose, hydroxyethyl hydroxypropyl cellulose comprising a polymerizable group selected from the group consisting of vinyl groups, epoxide groups and isocyanoate groups;

(d) polymerizing the composition produced in (c) above to provide for an optically clear xerogel composition;

(e) removing the blocking groups from said hydroxyl groups; and (f) hydrating the composition produced in (e) above.

12. The method according to claim 11 wherein the blocking groups on said monomer components are solvolyzable blocking groups.

13. The method according to claim 12 wherein the solvolyzable blocking groups are selected from the group consisting of acyl and haloacyl blocking groups of from 2 to 8 carbon atoms.

14. The method according to claim 13 wherein the blocking group is a haloacyl blocking group of the formula $X_3CC(O)O$— wherein each X is independently selected from the group consisting of fluoro and chloro.

15. The method according to claim 11 wherein the blocking groups are selected to reduce the volume change in the polymer composition during hydration.

16. The method according to claim 11 wherein said polymerization procedure (d) is conducted in the presence of water or a water containing solvent.

17. The method, according to claim 11 wherein said interpenetrants comprise one or more polymerizable groups.

* * * * *